(12) United States Patent
Bhalla

(10) Patent No.: US 10,281,721 B2
(45) Date of Patent: May 7, 2019

(54) SYSTEM AND METHOD FOR AUGMENTED REALITY HEAD UP DISPLAY FOR VEHICLES

(71) Applicant: 8696322 Canada Inc., Vaughan (CA)

(72) Inventor: Vijyat Bhalla, Vaughan (CA)

(73) Assignee: 8696322 Canada Inc., Vaughan (CA)

( * ) Notice: Subject to any disclaimer, the term of this patent is extended or adjusted under 35 U.S.C. 154(b) by 0 days.

(21) Appl. No.: 15/683,970

(22) Filed: Aug. 23, 2017

(65) Prior Publication Data

US 2018/0059416 A1    Mar. 1, 2018

Related U.S. Application Data

(60) Provisional application No. 62/378,274, filed on Aug. 23, 2016.

(51) Int. Cl.
| | |
|---|---|
| G08G 1/017 | (2006.01) |
| G02B 27/01 | (2006.01) |
| B60K 37/06 | (2006.01) |
| B60W 40/08 | (2012.01) |
| B60W 40/09 | (2012.01) |
| B60W 50/08 | (2012.01) |
| G06F 17/30 | (2006.01) |

(Continued)

(52) U.S. Cl.
CPC .......... *G02B 27/0101* (2013.01); *B60K 37/06* (2013.01); *B60W 40/08* (2013.01); *B60W 40/09* (2013.01); *B60W 50/08* (2013.01); *G06F 17/30386* (2013.01); *G06T 19/006* (2013.01); *G08G 1/0137* (2013.01); *G08G 1/0175* (2013.01); *B60W 2540/28* (2013.01)

(58) Field of Classification Search
CPC .................................. B60R 1/00; B60N 1/00
See application file for complete search history.

(56) References Cited

U.S. PATENT DOCUMENTS

| 7,596,242 B2 | 9/2009 | Breed |
| 7,663,502 B2 | 2/2010 | Breed |

(Continued)

OTHER PUBLICATIONS

Collie S., "Jaguar Virtual Windscreen concept looks to the future of HUDs," Gizmag, Jul. 13, 2014, at https://newatlas.com/jaguar-land-rover-virtual-windscreen-concept/32930/ (3 pages).

(Continued)

*Primary Examiner* — Shirley Lu
(74) *Attorney, Agent, or Firm* — Nixon Peabody LLP

(57) ABSTRACT

What is disclosed is a method for augmented reality head up display in a user vehicle comprising: capturing, by input devices, input data; receiving, by a communications manager, said captured input data from said input devices; receiving, by said communications manager, data from a communications path from at least one of a data center, and one or more external parties; providing, by said communications manager, said received captured input data from said input devices, and said data received from said communications path to a central processing unit (CPU) coupled to said communications manager; generating, by said CPU, custom data based on at least one of said received captured input data, and said data received from said communications path; and displaying, by a windshield projector, said generated custom data on a windshield of said vehicle.

20 Claims, 15 Drawing Sheets

(51) Int. Cl.
*G06T 19/00* (2011.01)
*G08G 1/01* (2006.01)

(56) References Cited

U.S. PATENT DOCUMENTS

| | | | |
|---|---|---|---|
| 7,920,102 | B2 | 4/2011 | Breed |
| 8,379,043 | B1 | 2/2013 | Paige |
| 8,428,873 | B2 | 4/2013 | Chau |
| 8,814,691 | B2 | 8/2014 | Haddick |
| 9,151,634 | B2 | 10/2015 | Ann |
| 2005/0046584 | A1 | 3/2005 | Breed |
| 2007/0057781 | A1 | 3/2007 | Breed |
| 2007/0086624 | A1 | 4/2007 | Breed |
| 2012/0041675 | A1 | 2/2012 | Juliver |
| 2012/0078686 | A1 | 3/2012 | Bashani |
| 2013/0050260 | A1 | 2/2013 | Reitan |
| 2014/0254877 | A1* | 9/2014 | Jankowski ............ H04L 63/08 382/105 |
| 2014/0272812 | A1 | 9/2014 | Hing |
| 2014/0375810 | A1 | 12/2014 | Rodriguez |
| 2015/0062168 | A1 | 3/2015 | Ng-Thow-Hing |
| 2015/0199547 | A1 | 7/2015 | Fraccaroli |
| 2015/0347848 | A1 | 12/2015 | Gurovich |
| 2016/0163108 | A1* | 6/2016 | Kim .................. G02B 27/0101 345/633 |

OTHER PUBLICATIONS

"Experience the TACNet® Difference," Visteon TACNet, 2005, downloaded at http://web.archive.org/web/2006120185649/http://www.evisteon.com/prod_serv/tacnet/media/tacnet_brochure.pdf (2 pages).

Gabbard J. L. et al., "Behind the Glass: Driver Challenges and Opportunities for AR Automotive Applications," Proceedings of the IEEE, vol. 102, No. 2, Feb. 2014, pp. 124-136 (13 pages).

Glockner H. et al., "Augmented Reality in Logistics: Changing the way we see logistics—a DHL perspective," DHL Customer Solutions & Innovation, Apr. 29, 2014 (28 pages).

Jeffrey C., "Continental's Augmented Reality HUD puts information on the road," Gizmag, Aug. 5, 2014, downloaded at http://www.gizmag.com/augmented-reality-hud-improves-driver-information/33223/ (4 pages).

Quick D., "LA Design Challenge 2012 puts out APB for patrol vehicles of 2025," Nov. 19, 2012, downloaded at https://newatlas.com/la-design-challenge-2012/25073/ (4 pages).

Sood R., "Pro Android Augmented Reality," Apress, 2012, pp. 4-5 (9 pages).

Spinks J., "BMW ePatrol: 2025 vision for a Californian pursuit vehicle," Nov. 22, 2012, downloaded at http://www.caradvice.com/au/201995/201995bmw-epatrol-2025-vision-for-a-californian-pursuit-vehicl/ (6 pages).

Stanley M., "Concept Document: WindScreen Law Enforcement WindShield," Apr. 23, 2010, downloaded at http://soaringhorse.blogspot.com/2010/04/concept-document-windscreen-law.html (2 pages).

Straight B., "Why trucking needs to care about augmented reality," Fleetowner, Jul. 2014, downloaded at http://www.fleetowner.com/blog/why-trucking-needs-care-about-augmented-reality (3 pages).

Youtube video of BMW ePatrol car, Nov. 27, 2012, https://www.youtube.com/watch?v=0qh5DNfzTc8&feature=youtu be.

Youtube video of BMW ePatrol car, Dec. 8, 2012, https://www.youtube.com/watch?v=uD9-Dh3C0No.

Youtube video still picture of BMW ePatrol car, 2012, downloaded at http://images.gizmag.com/gallery_lrg/la-design-challenge-2012-0.jpg (1 page).

Youtube video still picture of BMW ePatrol car, 2012, downloaded at http://images.gizmag.com/gallery_lrg/la-design-challenge-2012-1.jpg (1 page).

* cited by examiner

SYSTEM AND METHOD FOR AUGMENTED REALITY HEAD UP DISPLAY FOR VEHICLES

CROSS-REFERENCE TO RELATED APPLICATIONS

This application claims the benefit of and priority to U.S. Provisional Patent Application Ser. No. 62/378,274, filed Aug. 23, 2016, which is incorporated herein by reference in its entirety.

FIELD OF THE INVENTION

The present disclosure relates to augmented reality and head up displays.

BRIEF SUMMARY

An augmented reality head up display (AR-HUD) system for a user vehicle, comprising input devices; a windshield projector; a communications path coupled to a data center and one or more external parties; a central processing unit (CPU) communicatively coupled to said input devices, said communications path, and said windshield projector via a communications network manager; further wherein said input devices are used to capture input data; said communications network manager is used to receive said captured input data from said input devices, receive data from said communications path from at least one of said data center and said one or more external parties, and provide said received captured input data and said data received from said communications path to said CPU; said CPU is used to generate custom data based on at least one of said received captured input data, and said data received from said communications path; and said windshield projector is used to display said custom data generated by said CPU on a windshield of the vehicle.

A method for augmented reality head up display in a user vehicle comprising capturing, by input devices, input data; receiving, by a communications manager, said captured input data from said input devices; receiving, by said communications manager, data from a communications path from at least one of a data center, and one or more external parties; providing, by said communications manager, said received captured input data from said input devices, and said data received from said communications path to a central processing unit (CPU) coupled to said communications manager; generating, by said CPU, custom data based on at least one of said received captured input data, and said data received from said communications path; and displaying, by a windshield projector, said generated custom data on a windshield of said vehicle.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
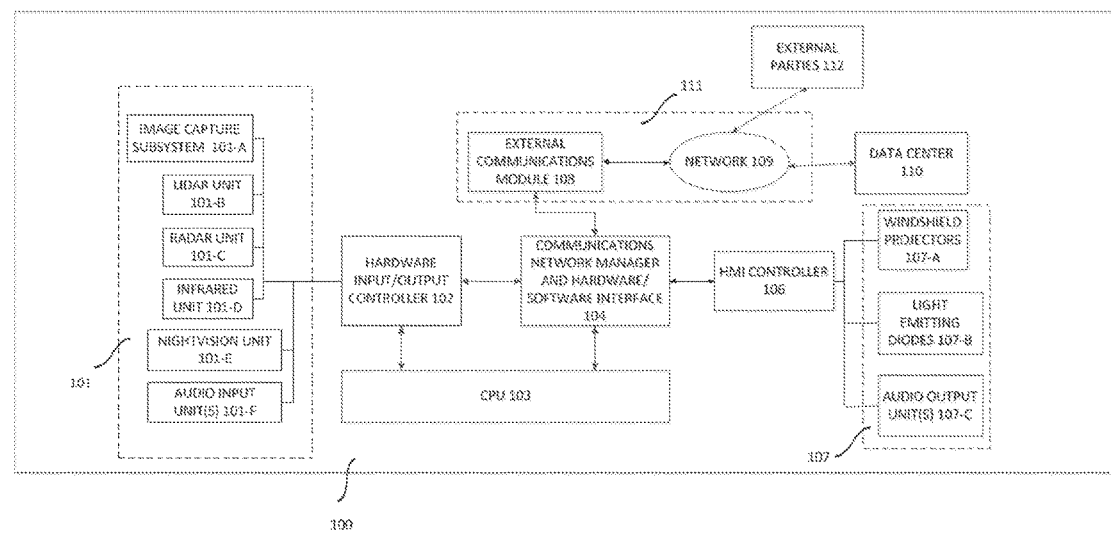
FIG. 1 shows an example of Information Technology (IT) infrastructure diagram within a user vehicle.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

FIG. 1 shows a diagram of an example Information Technology (IT) infrastructure 100 within a user vehicle for one embodiment of the system and method that is the subject of this specification. While example applications for law enforcement are described below, one of skill in the art would understand that the embodiments described below are applicable to fields other than law enforcement. It would also be known to one of skill in the art that examples of users of such a system include a driver of the vehicle, a passenger of the vehicle, or in the case of an autonomous vehicle, a person sitting where the driver of the vehicle would customarily sit.

Referring to FIG. 1, input devices 101 comprise two or more of, for example, a) Image capture subsystem 101-A comprising one or more image and/or video capture devices including dashboard video cameras, body cameras mounted on the body or head of the user, and eye position detecting cameras which detect the position of the user's eyes and enable display of augmented reality elements which are overlaid with real world objects on the vehicle windshield;

b) Light Detection And Ranging (LIDAR) unit 101-B;

c) Radio Detection And Ranging (RADAR) unit 101-C;

d) infrared unit 101-D;

e) night vision unit 101-E; and f) one or more audio input units 101-F including microphones and other sound recording units, further including sound recording units mounted on the body or head of the user.

The input devices 101 are used to capture input data and information. The captured input data and information is transmitted to a communicatively coupled hardware input/output (HW I/O) controller 102. HW I/O controller 102 serves as a data acquisition (DAQ) subsystem for the information captured by input devices 101. In one embodiment, HW I/O controller 102 comprises an inbuilt storage unit. HW I/O controller 102 receives data from the input devices 101, compiles the data received from the connected input devices 101, then stores and processes this compiled and received data in the inbuilt storage unit.

For certain tasks, it is necessary to further process and store this compiled and received input data. In one embodiment, HW I/O controller 102 transmits this compiled and received data to central processing unit (CPU) 103, which is communicatively coupled to HW I/O controller 102. There are many possible embodiments for CPU 103. In one embodiment, CPU 103 is a laptop. In another embodiment, CPU 103 is a suitable computing device for use in a vehicle such as, for example, a tablet. In another embodiment, CPU 103 is housed within a larger computing device.

CPU 103 performs further processing and storage of this compiled and received input data. In yet another embodiment, a user such as a law enforcement officer supplies one or more input commands to the CPU 103 to enable further processing of this input data.

The HW I/O controller 102 is also communicatively coupled to a communications network manager (CNM) 104 with hardware and software interface. CNM 104 transmits data using various available network technologies including, for example, Campus Area Network (CAN), Local Area Network (LAN), Bluetooth, Radio Frequency Identification (RFID), Wi-Fi, and optical fiber.

Figure 2:
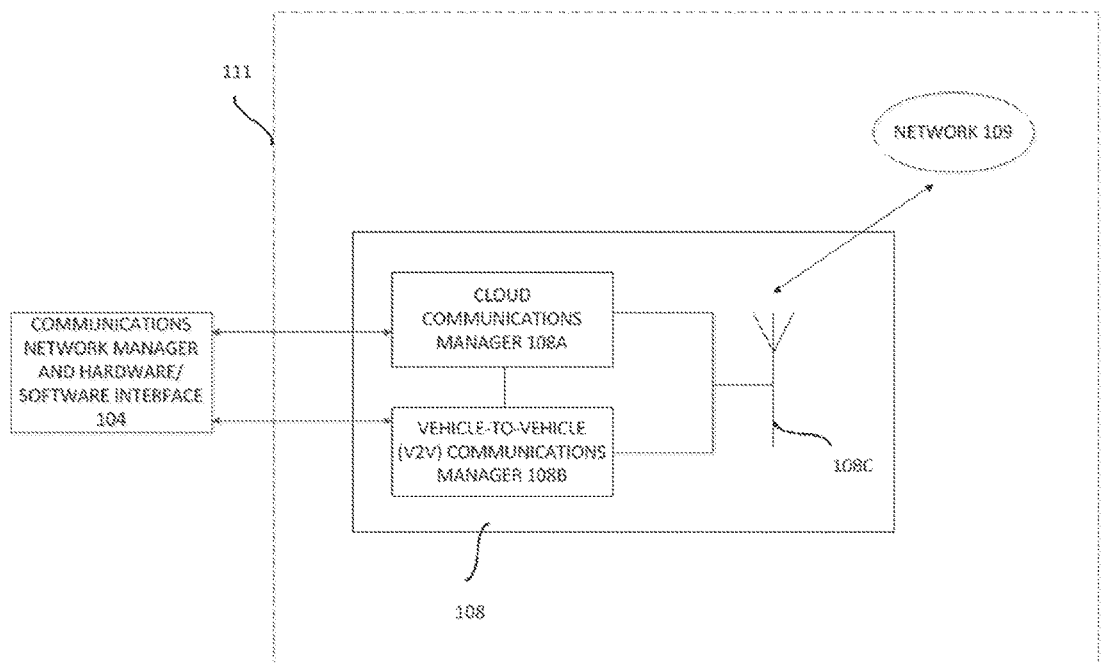
FIG. 2 shows an example embodiment of an external communications module.

CNM 104 is also communicatively coupled to communications path 111. In one embodiment, communications path 111 comprises an external communications module 108 and network 109. Communication path 111 is used to transmit and receive various communications to and from the vehicle. These communications comprise, for example, emails, telephone calls, instant messages, video conferencing sessions, requests for data and retrieved data returned in response to a data request. FIG. 2 shows an example embodiment of an external communications module 108. In this embodiment, external communications module 108 comprises cloud communication manager 108A and vehicle-to-vehicle (V2V) communication manager 108B, both of which are interconnected with each other and also coupled to antenna 108C. Cloud communication manager 108A and V2V communication manager 108B also communicate with CNM 104. In one embodiment, cloud communication manager 108A and V2V communication manager 108B transmit data to, and receive data from, data center or headquarters 110 via network 109 and antenna 108C. Network 109 uses one or more wireless communication technologies such as radio frequency (RF), short wave, Wi-Fi and GSM.

In one embodiment, the communication path 111 is also connected to external parties 112. External parties 112 comprise, for example, other users in other vehicles, emergency medical services and other services or subsystems which have a need to communicate with the driver. In a further embodiment, external parties 112 communicate with the user vehicle via data center 110.

CNM 104 is also communicatively coupled to a human machine interface (HMI) controller 106. HMI controller 106 is communicatively coupled to one or more output devices 107 comprising, for example, windshield projector 107-A, light emitting diode (LED) 107-B and audio output unit(s) 107-C. Examples of audio output unit(s) 107-C include in-car speakers, and earpieces mounted on the body of the user.

CNM 104 is also communicatively coupled to CPU 103 to receive and transmit information, data and commands from and to CPU 103. Inputs supplied to CNM 104 via HW I/O controller 102, external communications module 108 and CPU 103 are processed by CNM 104 and displayed on, for example, the windshield of the vehicle using windshield projector 107-A and light emitting diode (LED) 107-B. Therefore CNM 104 acts as the communications hub for the vehicle.

As explained previously, CPU 103 performs further processing of input data received from HW I/O controller 102. CPU additionally allows a user to input commands and data to perform various functions comprising, for example, sending search requests to retrieve data from data center 110, processing of data received from data center 110, and input devices 101 via HW I/O controller 102, generating of custom data to be displayed on the windshield of the user vehicle via windshield projectors 107-A. This comprises, for example, implementing calculations and algorithms to enable display of augmented reality overlay elements on a windshield of the user vehicle, transmitting the generated custom data to windshield projectors 107-A via CNM 104, and output of audio from audio output unit(s) 107-C.

As is known to one of skill in the art, CPU 103 may additionally comprise storage units, peripheral drives such as compact disc (CD) drives, Universal Serial Bus (USB) interfaces, audio output unit(s) such as speakers, audio recording units, video recording units, inbuilt displays, and so on. CPU 103 is coupled to communication path 111 and one or more output devices 107 via CNM 104.

Figure 3:
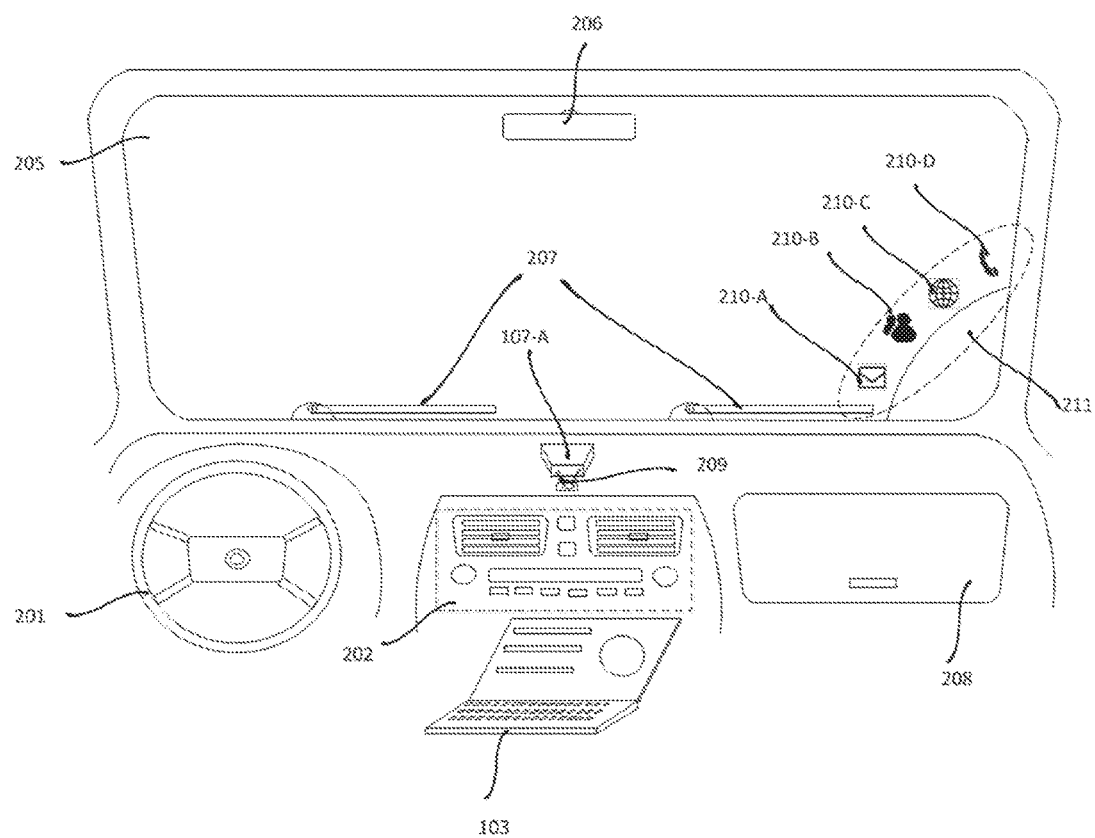
FIG. 3 shows an in-vehicle view for a left hand drive user vehicle.

FIG. 3 shows an in-vehicle view for a left hand drive vehicle. In FIG. 3, steering wheel 201 is used to maneuver the vehicle. Central console/infotainment system 202 is positioned in the center of the vehicle dashboard between the front left and right passenger seats. CPU 103 is coupled to the rest of the vehicle IT infrastructure via CNM 104 as explained previously, so as to enable a user to perform one or more tasks as required. Windshield 205 allows for the user to see a full view of the surrounding environment while being protected from the surroundings. This is useful to, for example, a driver to maneuver the vehicle appropriately. Windshield 205 is also used for projection of displays, as will be explained below. Windshield 205 is fabricated from an appropriate material such as laminated safety glass. Rear-view mirror 206, windshield wipers 207 and glove compartment 208 are standard devices found on a vehicle.

In order for the user to perform tasks, custom data 211 comprising, for example, notifications, icons, augmented reality overlay elements and other information are generated using the CPU 103, and displayed on windshield 205 using windshield projectors 107-A. Custom mount 209 is used to help support and secure the windshield projectors 107-A. The HMI controller 106 of FIG. 1 allows the user to modify visual parameters of custom data 211 such as brightness, colors and orientation. The actual content parameters of the custom data 211 can be modified using the CPU 103.

In some of the embodiments below, examples of displays of augmented reality overlay elements which are overlaid proximate to the user's views of real world objects on the windshield 205 will be described. Examples of augmented reality overlay elements include tags. Methods and systems to generate such displays are known to those of skill in the art. For example, it is known to those of skill in the art that in order to generate such augmented reality overlay elements it is necessary to detect:

user eye position using, for example, eye position detecting cameras which are part of image capture subsystem 101-A and/or other input devices within the input devices 101; and real world object positions as viewed through the windshield 205 using input devices 101, for example
cameras which are part of image capture subsystem 101-A,
LIDAR unit 101-B, and
RADAR unit 101-C.

Then, the information captured by the input devices 101 above needs to be processed so as to enable the generation of display of augmented reality overlay elements which are then overlaid proximate to the user's view of real world objects on the windshield 205. Methods and systems to perform this processing and generate the display of augmented reality overlay elements are described in, for example, U.S. Pat. No. 9,690,104 "Augmented Reality HUD Display Method and Device for Vehicle" assigned Ser. No. 14/846,781, filed Sep. 6, 2015 to Kim. U.S. Pat. No. 9,690,104 explains methods and systems to detect a position of a real world object outside of the user's vehicle at which the user is looking;

detect user eye position while the user is viewing external real world object information displayed on windshield 205;

extract augmented reality display coordinates of the real world object based on the detected object position and augmented reality display coordinates of the eye based on the detected eye position;

correct one or more errors in the augmented reality display coordinates of the real world object and one or more errors in the augmented reality display coordinates of the eye;

receive the corrected augmented reality display coordinates of the object and the corrected augmented reality display coordinates of the eye; and display augmented reality overlay elements on the windshield based on the received corrected augmented reality display coordinates.

These methods and systems are implemented by, for example, one or more of HW I/O controller 102, CPU 103 and CNM 104.

In one embodiment, custom data 211 comprises icons 210-A to 210-D, each corresponding to a specific functionality. One or more of the icons are displayed on the user vehicle windshield 205 using windshield projectors 107-A. These icons will be described further below and in FIGS. 4-7. While the example below refers to four (4) icons, it would be known to one of skill in the art that this is merely an illustrative example, and there may be less or more than four icons. Also, the shapes and sizes of the icons are not restricted to the shapes and sizes depicted in the diagrams. The colors of the icons are not restricted either.

Figure 4:
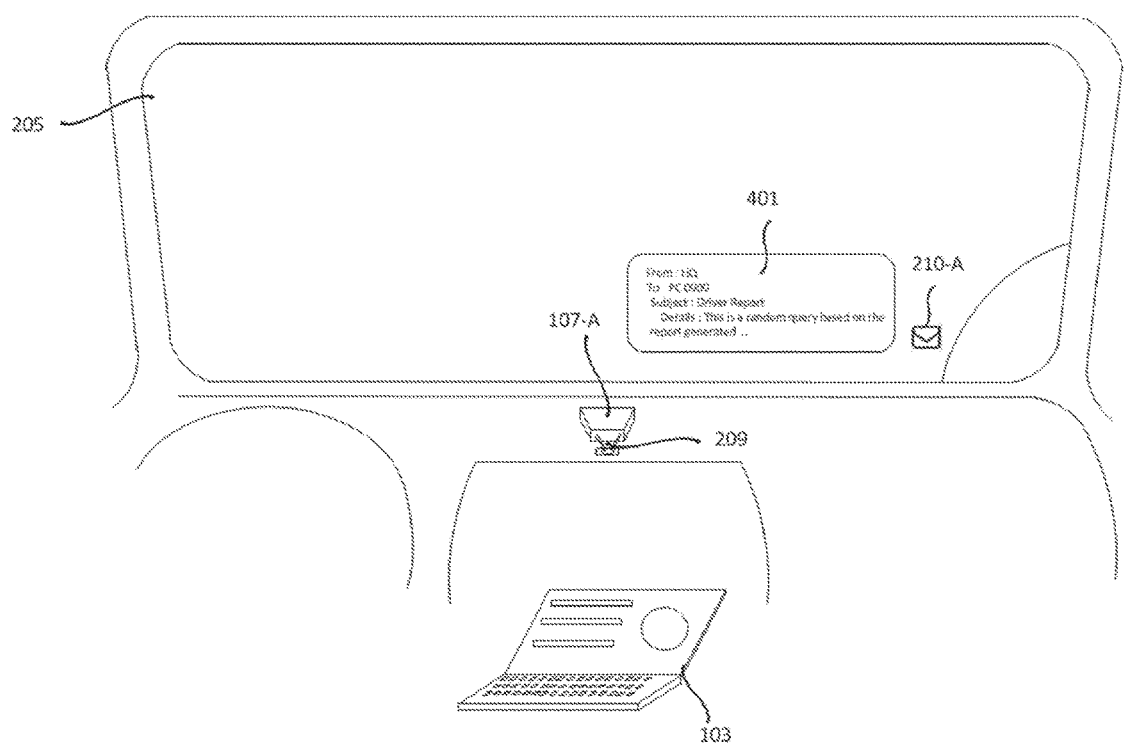
FIG. 4 shows an example of a view seen by the user on a windshield for an incoming email.

Icon 210-A is an email icon, which is automatically activated when there is an incoming email. Emails are received by CPU 103 from, for example, external parties 112 or data center 110 via communications path 111 and CNM 104. FIG. 4 shows one example of a view seen by a user on the user vehicle windshield 205 when an incoming email is displayed. In one embodiment, when the incoming email is received by CPU 103, custom data 211 comprising a summary notification 401 is
generated by CPU 103, and
displayed on the windshield by windshield projectors 107-A mounted on custom mount 209 as shown in FIG. 4.

In another embodiment, there is an accompanying audio notification which is either outputted by CPU 103 or for example audio output unit(s) 107-C. In yet another embodiment, upon receiving the appropriate commands from CPU 103, the entire email is displayed on the windshield 205. If the user wishes to send an outgoing email message, in one embodiment the user activates icon 210-A first then sends the outgoing email. In another embodiment, there is a different email icon displayed corresponding to the situation where there are multiple incoming emails. For example, in one embodiment the multiple email icon is one copy of icon 210-A stacked on top of another copy of icon 210-A. In another embodiment, multiple summary notifications are visible on the windscreen 205 corresponding to multiple incoming messages.

Figure 5:
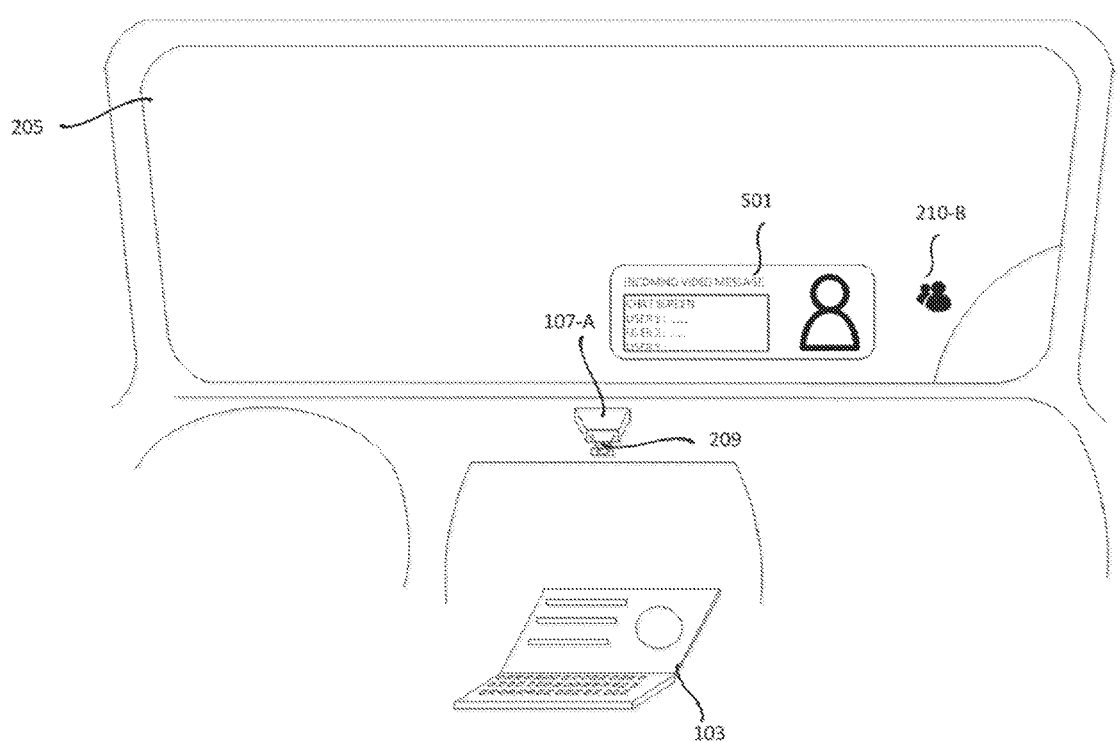
FIG. 5 shows an example of a view seen by the user on a windshield for a received instant message.

Icon 210-B is a messenger icon. Instant messages are received by CPU 103 from, for example, external parties 112 or data center 110 via communications path 111 and CNM 104. FIG. 5 shows one example of a view seen by a user on user vehicle windshield 205 when an instant message is received. As shown in FIG. 5, icon 210-B is automatically activated when there is an incoming instant message received by CPU 103. Instant messages comprise, for example text, audio and video. Instant messages are, for example, messages sent from a sender to an entire group of users, that is, group messages; and messages sent from a sender to one user, that is, one-to-one messages.

In one embodiment, when icon 210-B is activated, the incoming instant message is displayed on the windshield 205 as part of custom data 211 comprising a chat session within a chat window 501 using windshield projectors 107-A mounted on custom mount 209. This allows the user to read and respond to the instant message. When the user of the vehicle wishes to initiate a messaging session by sending an outgoing instant message, the user activates icon 210-B and then sends the outgoing instant message. In one embodiment, this icon is activated when there is an incoming video conferencing request. This allows for the user to hold a video conference with another user, if the other user requests a video conference. The audio from the video conference is played via, for example, one or more audio output units 107-C or via the in-built speakers in CPU 103. The video to be sent from the vehicle for the video conference is received by, for example, dashboard cameras or body cameras which form part of image capture subsystem 101-A, or inbuilt video recording units which are part of CPU 103. In another embodiment, this icon is activated by the user, when the user wants to send a request to another user for a video conference. While the example of one-to-one instant messaging and video conferencing is described above, it would be clear to one of skill in the art that there are embodiments where the user is allowed to send instant messages and have video conferences with multiple other users. In another embodiment, there is a multiple messenger icon displayed corresponding to the situation where there are multiple incoming instant messages. For example, in one embodiment the multiple messenger icon could be one copy of icon 210-A stacked on top of another copy of icon 210-A. In another embodiment, multiple chat windows are opened and visible on windshield 205 corresponding to the situation where there are multiple incoming messages and chat sessions.

Figure 6:
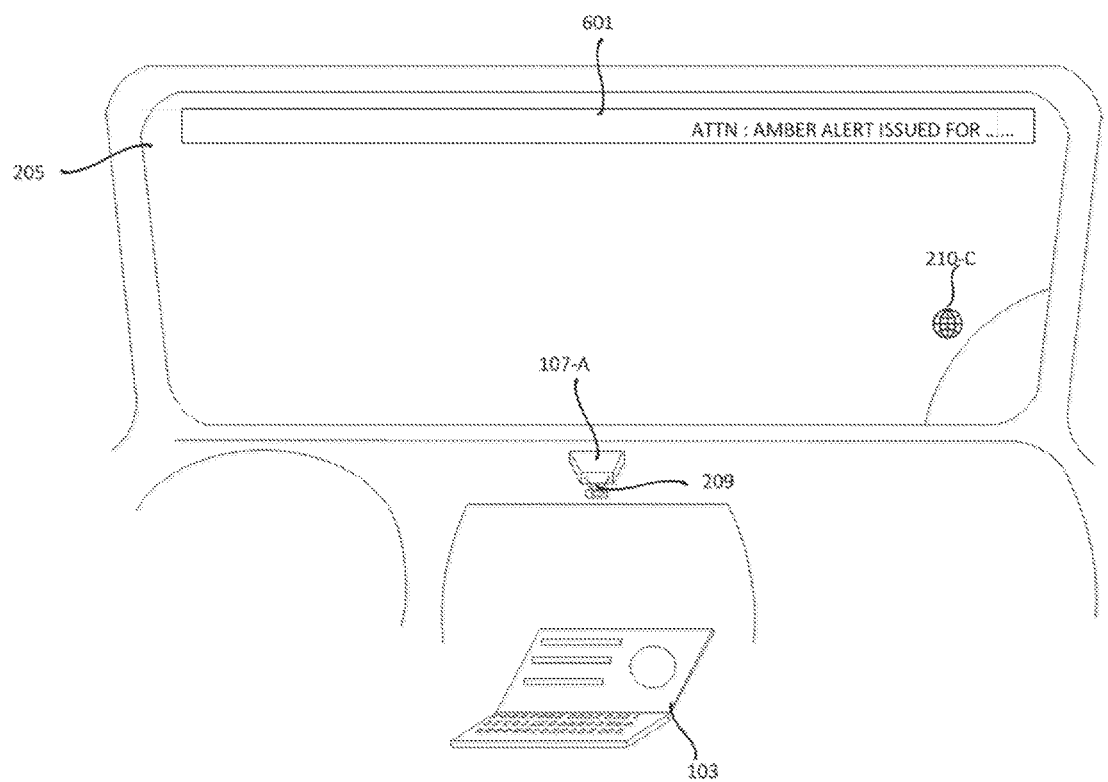
FIG. 6 shows an example of a view seen by the user on a windshield for a received broadcast message.

In an example embodiment, broadcast messages are received by, and sent from the user vehicle. The received messages are received by CPU 103 from, for example, external parties 112 or data center 110 via communications path 111 and CNM 104. FIG. 6 shows one example of a view seen by a user on windshield 205 when a broadcast message is received. As shown in FIG. 6, in one embodiment, when a broadcast message is received by CPU 103 then broadcast message icon 210-C is activated. Then, CPU 103 appropriately formats the received messages for display on windshield 205. CPU 103 then displays the received message as part of custom data 211. Specifically, custom data 211 comprising a scrolling banner 601 is displayed on the windshield 205 via windshield projectors 107-A mounted on custom mount 209. In one embodiment, the scrolling banner 601 is displayed across the top of the windshield 205 by windshield projectors 107-A. In one embodiment scrolling banner 601 is comprised of one or more of text and images. In a further embodiment, the scrolling banner 601 scrolls horizontally either from left to right, or from right to left. In a further embodiment, an incoming broadcast message is repeated in a loop in the scrolling banner 601 at either a pre-determined frequency or a user-defined frequency. In another embodiment, the broadcast message is repeated a number of times in scrolling banner 601. The number of repetitions is either pre-determined or set by the user. In a further embodiment, the incoming broadcast message is displayed repeatedly until interrupted by the user. In an embodiment where there are multiple incoming broadcast messages, the multiple incoming broadcast messages are displayed in the scrolling banner 601 one after another and repeated as described above. In a further embodiment, the user activates icon 210-C to send broadcast messages.

Figure 7:
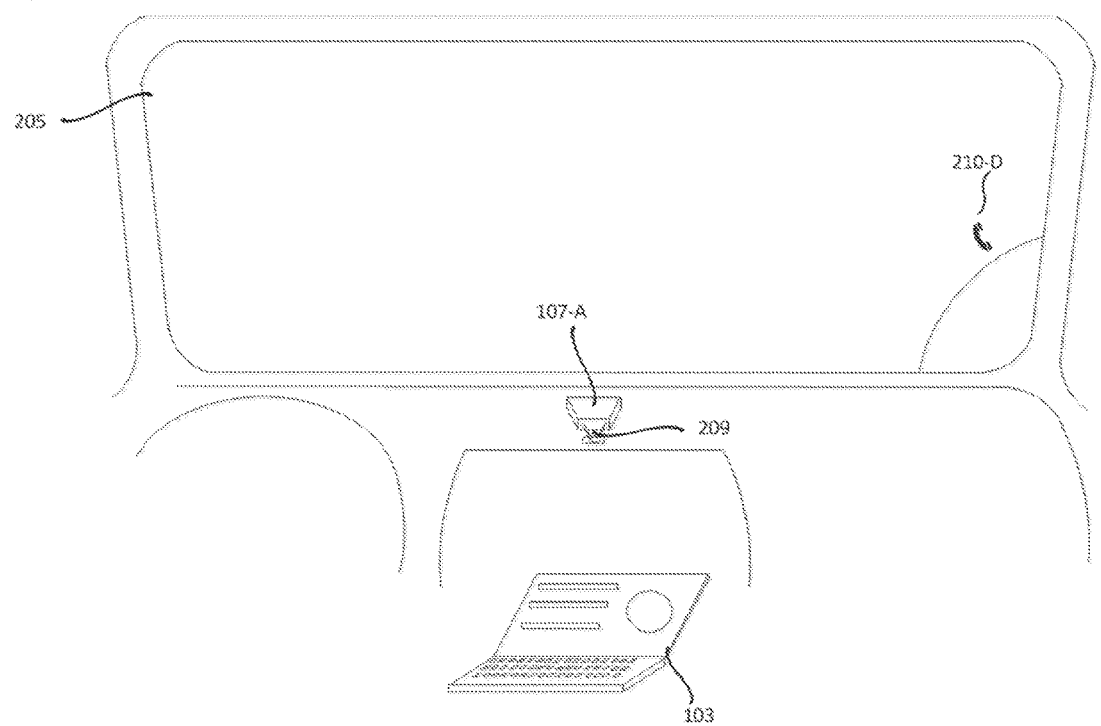
FIG. 7 shows an example of a view seen by the user on a windshield for an incoming telephone call.

In an example embodiment, telephone calls are received by, and sent from the user vehicle. FIG. 7 shows one example of a view seen by a user when there is an incoming telephone call. As shown in FIG. 7, if there is an incoming telephone call then telephone icon 210-D is automatically activated and becomes visible on windshield 205. In a further embodiment, a first telephone notification icon is displayed comprising the name, picture and icon of the source of the incoming call. The audio received by the vehicle is played using, for example, one or more audio output unit's 107-C or inbuilt speakers on CPU 103. The audio to be sent from the vehicle is recorded by, for example, one or more audio input units 101-F or inbuilt audio recording units on CPU 103. In another embodiment, the user activates telephone call icon 210-D when the user wishes to make an outgoing telephone call from the vehicle. Incoming and outgoing telephone calls are received or transmitted via communications path 111. This allows for a user to have a telephone call with another sender. In another embodiment, if there is a second incoming call while the user is participating on a first incoming call, then a "call waiting" feature is activated. In a further embodiment, the second incoming call is displayed as an additional notification icon displaying the name, picture and icon of the source of the incoming call. In yet another embodiment, if the second incoming call is not answered within a certain time period, then the caller on the second incoming call is directed to voicemail.

Figure 8:
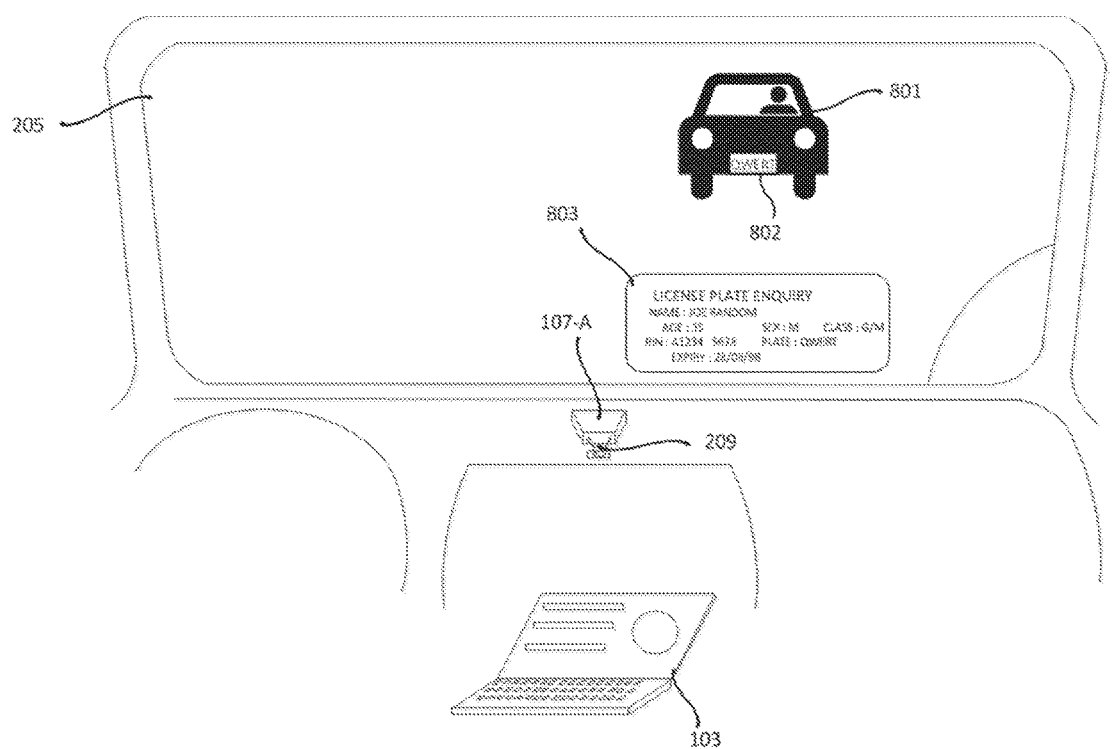
FIG. 8 shows an example of a view seen by the user on a windshield for a license plate search.
Figure 8B:
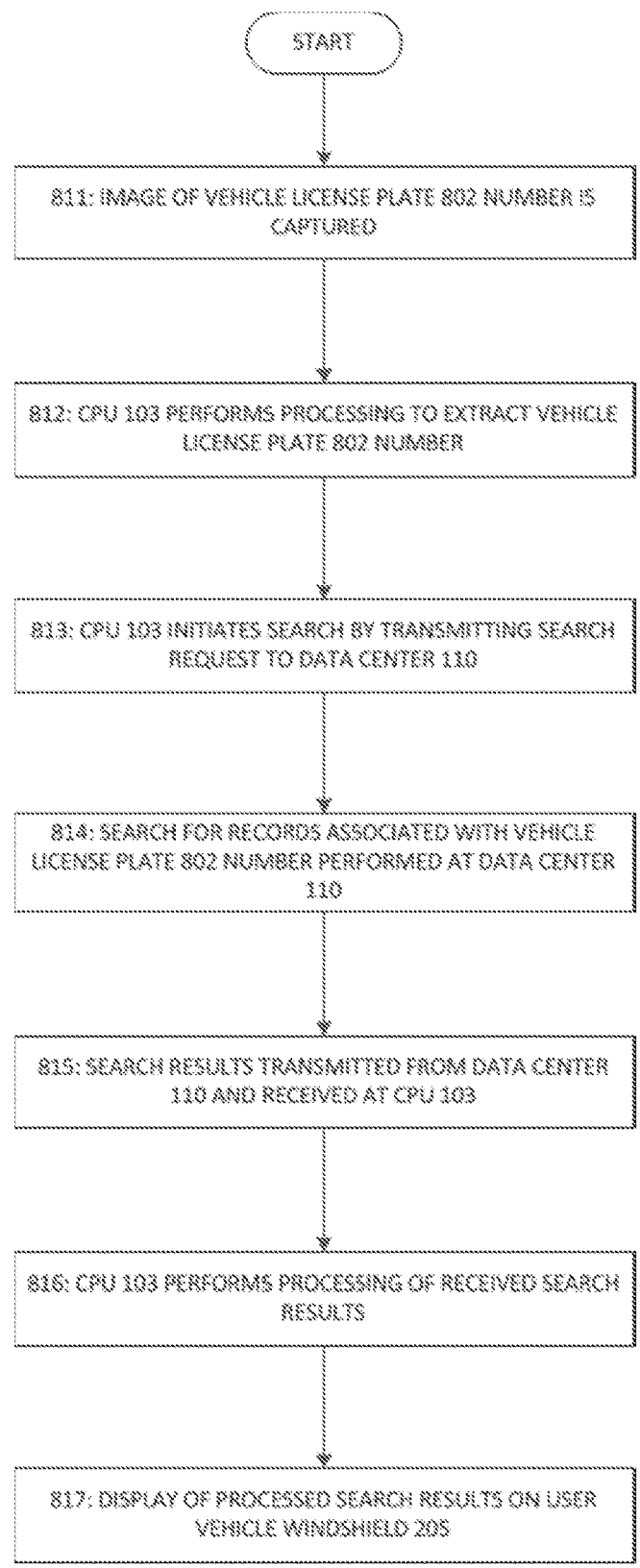
FIG. 8B shows an example process for a target vehicle license plate search.

In another embodiment, the system allows the user to perform an identity search or a target vehicle license plate search, and have the results returned to the user vehicle. An example of a view seen by a user on windshield 205 is shown in FIG. 8 for a license plate search, and an example process for a target vehicle license plate search is shown in FIG. 8B. Target vehicle 801 bearing a license plate 802 with license plate number "QWERT" is visible in windshield 205. Using image capture system 101-A, an image of the target vehicle license plate 802 number is captured in step 811 in FIG. 8B. While FIG. 8 shows an example where the target vehicle license plate 802 is oriented horizontally, it is known to one of skill in the art that this is not the only possible orientation. This information is transmitted to CPU 103 via, for example, HW I/O controller 102. Then CPU 103 performs processing using, for example, optical character recognition (OCR) or image recognition techniques to extract the target vehicle license plate 802 number in step 812 in FIG. 8B. In one embodiment, the OCR subsystem running on CPU 103 is sufficiently intelligent to distinguish the vehicle license plate 802, and extract the vehicle license plate 802 number when the orientation is not horizontal. After this, a search of the target vehicle license plate 802 number is initiated from CPU 103 in step 813 of FIG. 8B. The search request comprising the extracted target vehicle license plate number is transmitted to data center 110 via CNM 104 and communications path 111. At the data center 110, a search for records associated with the target vehicle license plate 802 number is performed in step 814 of FIG. 8B. The results of the search are then transmitted from data center 110 and received at CPU 103 via CNM 104 in step 815 of FIG. 8B. These results include, for example:

the license details of the registered driver of the target vehicle, comprising
        the driver's name
        the driver's age,
        the driver's gender,
        the driver's license class, and
        license expiry date.
    Details of the target vehicle registration, comprising
        Vehicle Identification Number (VIN),
        Insurance details,
        Class of vehicle, and
        Vehicle registration expiry date.

The CPU 103 performs processing of received search results including appropriate formatting before the received search results are displayed in step 816 of FIG. 8B. In one embodiment, in step 816, based on the processed search results, custom data 211 is generated by CPU 103 for display on the user vehicle windshield 205. The generated custom data 211 is then displayed on windshield 205 in step 817 of FIG. 8B. In one embodiment, custom data 211 comprises item 803 of FIG. 8, which is displayed on the windshield 205. Item 803 comprises, for example, the license details of the registered driver of the target vehicle as described previously,
    the target vehicle license plate 802 number, and
    the target vehicle registration details as described previously.

In a further embodiment, custom data 211 comprises one or more augmented reality overlay elements is used to augment the user's view of the target vehicle 801 on the windshield 205. In one specific embodiment, the one or more augmented reality overlay elements comprises item 803. CPU 103 generates the one or more augmented reality overlay elements as part of step 816 of FIG. 8B. This is achieved by, for example, CPU 103 making item 803 into a tag to overlay the user's view of target vehicle 801 on windshield 205, such that it is proximate to vehicle 801 and follows the motion of target vehicle 801. While an example application to one vehicle has been described here, one of skill in the art would appreciate that this is generalizable to the case where the identities of a plurality of vehicles are to be determined. In some situations, there may be a combination of vehicles having multiple license plates which need to be identified. For example, if target vehicle 801 is towing a trailer, there are two license plates corresponding to the target vehicle 801 and the trailer. In such an example, the multiple plates are searched and identified.

Figure 8C:
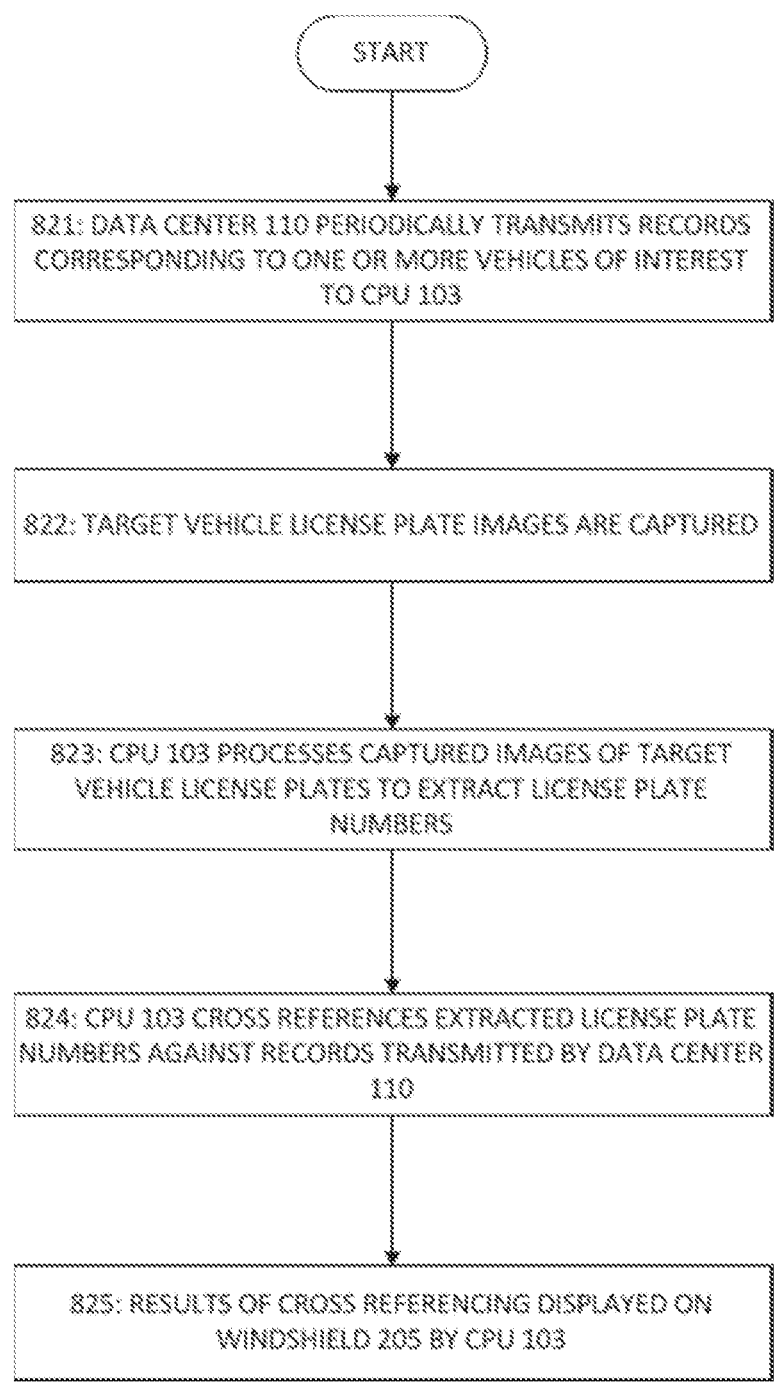
FIG. 8C shows an example process for a reverse lookup for a target vehicle license plate.

In a further embodiment, the system is enabled to perform a reverse lookup of target vehicle license plates. An example process for a reverse lookup is shown in FIG. 8C. For example, data center 110 periodically transmits records corresponding to one or more vehicles of interest such as stolen vehicles to CPU 103 in step 821 of FIG. 8C. Then target vehicle license plate images are captured as described above in step 822 of FIG. 8C. These images are processed by CPU 103 using OCR or other image recognition techniques as described above to extract license plate numbers in step 823 of FIG. 8C. The extracted license plate numbers are cross-referenced by CPU 103 against the records transmitted by data center 110 in step 824 of FIG. 8C. The results of the cross referencing are displayed on windshield 205 by CPU 103 in step 825 of FIG. 8C. In one embodiment, if there is a match, then the user's view of the matched vehicle is augmented with one or more augmented reality overlay elements such as tags bearing information associated with the records obtained by said matching. In one embodiment, these one or more augmented reality overlay elements are proximate to the view of the user of the matched vehicle on windshield 205.

Figure 9:
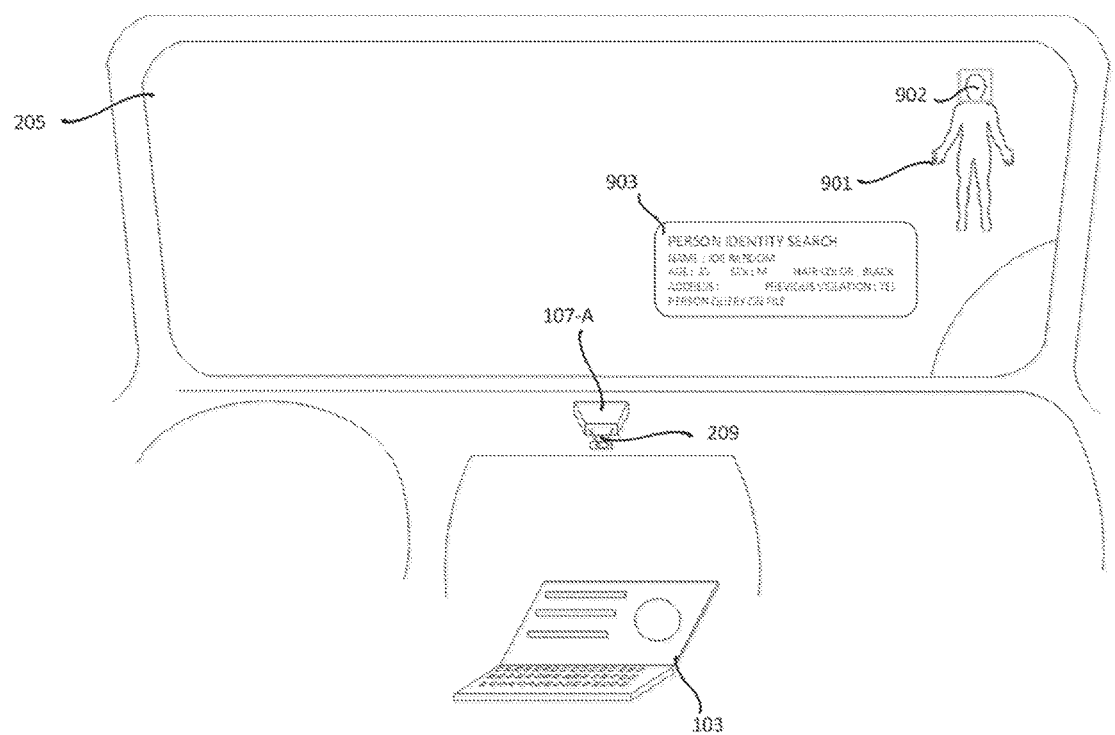
FIG. 9 shows an example of a view seen by the user on a windshield for an identity search.
Figure 9B:
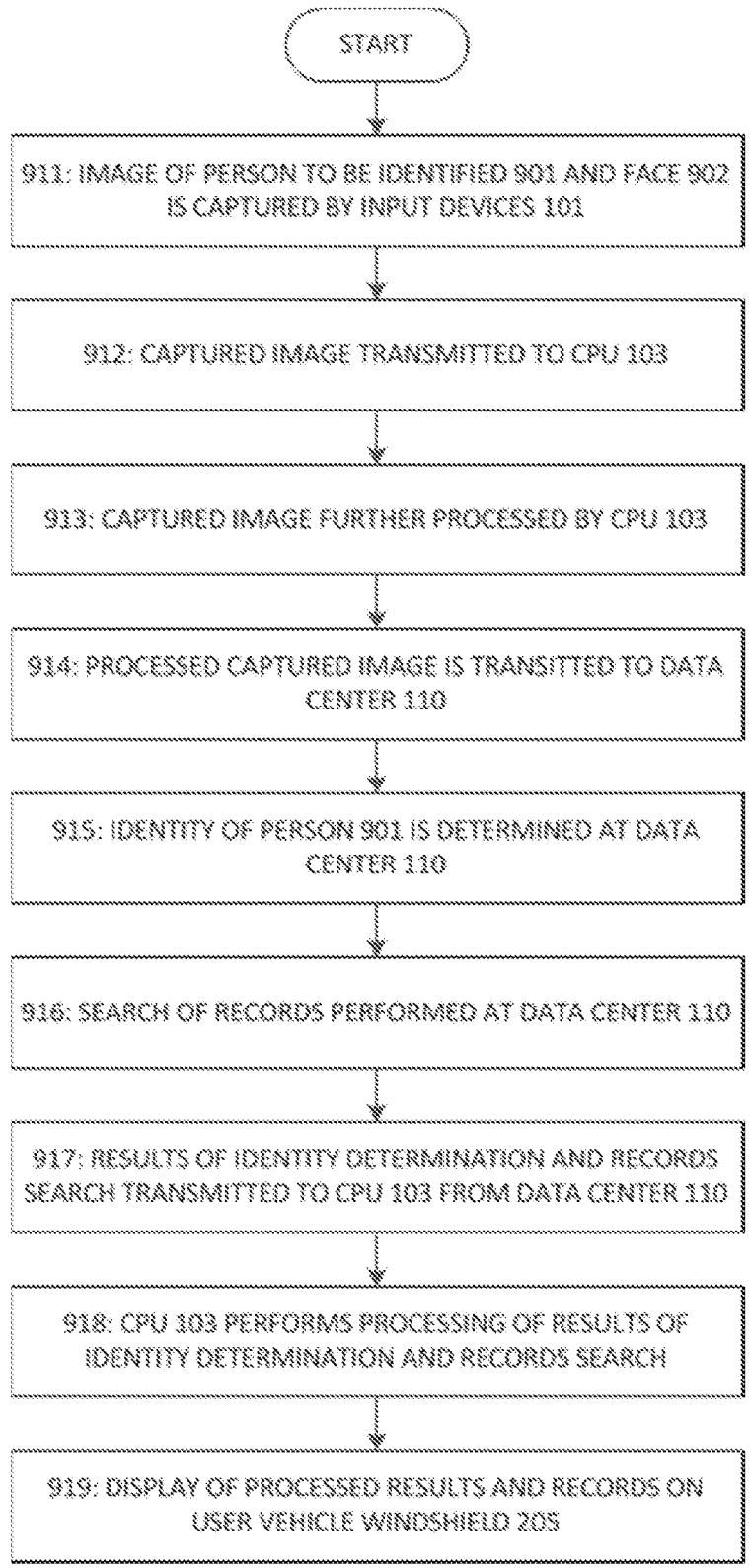
FIG. 9B shows an example process for an identity search.

An example of an identity search for a person to be identified is described below. FIG. 9 shows one example of a view seen by a user on windshield 205 for an identity search, and FIG. 9B shows an example process. In FIG. 9, person 901 with face 902 is to be identified. Firstly, in step 911 of FIG. 9B, an image of person 901 and face 902 is captured. This is performed by one or more of the input devices 101. For example, image capture subsystem 101-A captures an image of person 901 and face 902. In another example, if the identity of person 901 with face 902 needs to be determined at night, then image capture system 101-A together with night vision unit 101-E captures an image of person 901 and face 902. The captured image is then transmitted to CPU 103 via HW I/O controller 102 and CNM 104 in step 912 of FIG. 9B. The captured image is then further processed by CPU 103 in step 913 of FIG. 9B. In step 914 of FIG. 9B, the processed captured image is transmitted to data center 110, where the identity of person 901 is determined in step 915 of FIG. 9B. This is performed using, for example, facial recognition techniques and searching identity databases available to data center 110. Then, a search of the person's records is performed at data center 110 in step 916 of FIG. 9B. The results of the identity determination and records search comprising, for example, identity information and criminal records is transmitted to CPU 103 from data center 110 via CNM 104 and communications path 111 in step 917 of FIG. 9B. Then, in step 918 of FIG. 9B CPU 103 performs one or more processing steps on the results of the identity determination and records search as required including, for example, appropriate formatting. Custom data 211 based on these processed results and records are generated by CPU 103. CPU 103 transmits custom data 211 to windshield display projectors 107-A for display on windshield 205 in step 919 of FIG. 9B. In one specific embodiment, item 903, which is part of custom data 211, is displayed on windshield 205. Item 903 comprises, for example, identifying information of the person 901 as well as any possible criminal records. In one embodiment, the user's view of the person is augmented with item 903 displayed on the windshield. For example, the view of the person is augmented with a tag comprising item 903. The tag is generated by, for example, CPU 103. This allows the user to, for example, apprehend a suspect more easily. While an example application to one person has been described here, one of skill in the art would appreciate that there are example embodiments where this is generalized to the case where the identities of a plurality of people are to be determined.

Figure 9C:
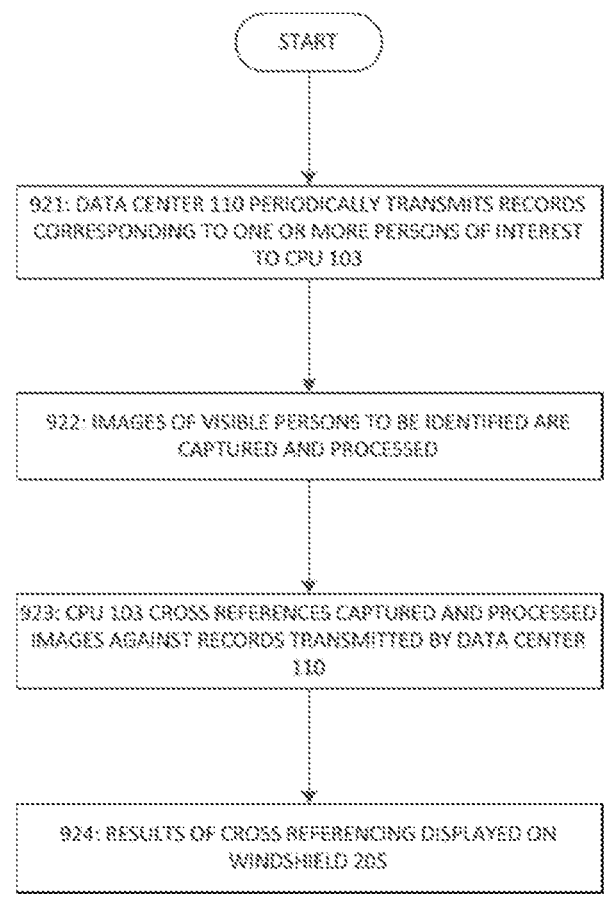
FIG. 9C shows an example process for a reverse lookup for an identity of a person.

In a further embodiment, the system is enabled to perform a reverse lookup of a person to be identified. An example process is described in FIG. 9C. In step 921 of FIG. 9C, data center 110 periodically transmits records corresponding to one or more persons of interest to CPU 103. In step 922 of FIG. 9C, images of faces of people who are visible to the user via windshield 205 and are to be identified are captured and processed as described above. In step 923, these images are cross-referenced by CPU 103 against the records transmitted by data center 110. The results of the cross referencing are displayed on windshield 205 in step 924. In one embodiment, if a match is obtained, then in step 924 of FIG. 9C the view of the user of the person of interest is augmented with a corresponding augmented reality overlay element such as a tag.

It would be obvious to one of skill in the art that the processes described above can be generalized to a plurality of persons to be identified and a plurality of target vehicles. In a further embodiment, two or more of the license and identity search and reverse lookup processes described above are carried out simultaneously, and the displays for the search results for each are shown in a combined display on the windscreen. Then, in one embodiment, the combined display comprises a plurality of augmented reality overlay elements displayed proximate to the user's views of the people and target vehicles on windshield 205.

Figure 10:
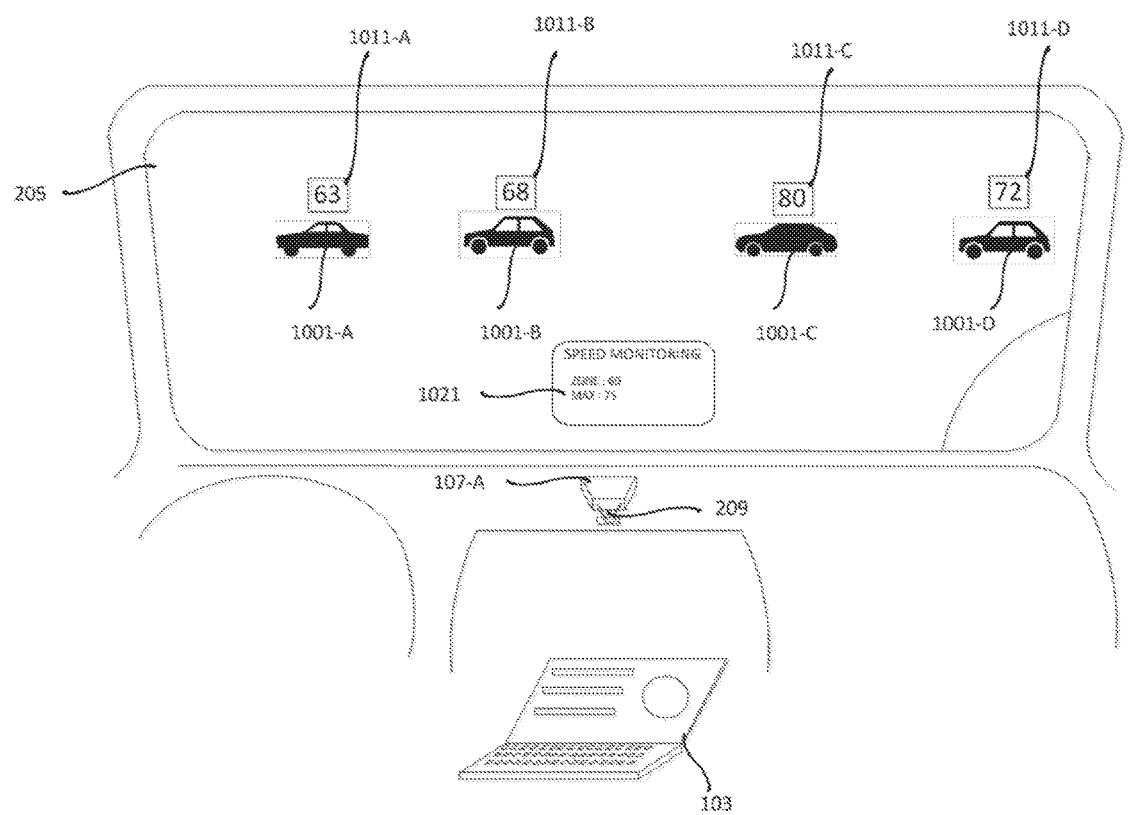
FIG. 10 shows an example of a view seen by the user on a windshield for tracking the speeds of vehicles.
Figure 10B:
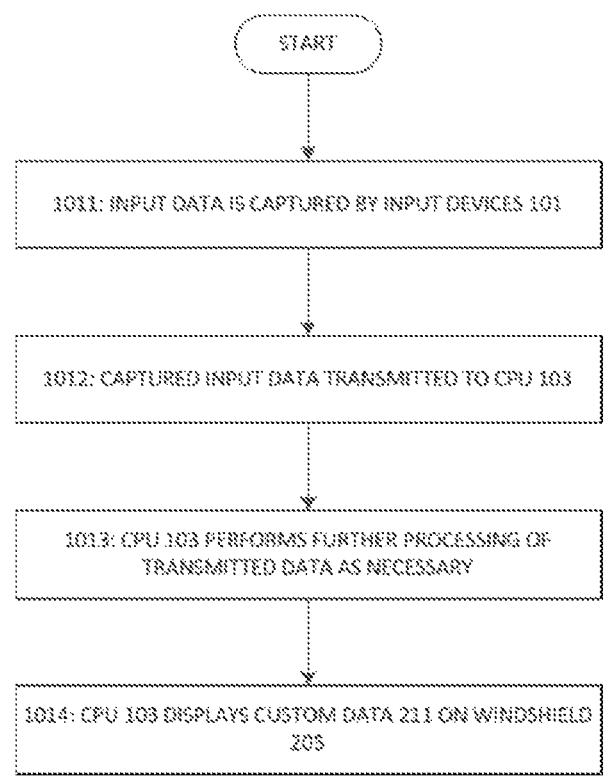
FIG. 10B shows an example process of tracking the speeds of vehicles.

In some embodiments, information from two or more of the input devices 101 is used to perform tasks. FIG. 10 shows one example of a view seen by a user for performing the operation of tracking the speeds of different target vehicles, and FIG. 10B describes an example process. In FIG. 10 vehicles 1001-A to 1001-D are observed by the user via user vehicle windshield 205. In step 1011 of FIG. 10B, input data is captured by input devices 101. For example, the speeds of these target vehicles are measured and the images of these target vehicles are also captured. For example, for each target vehicle, RADAR unit 101-C captures the speed; and image capture subsystem 101-A and optionally one or more of the other input devices 101 captures one or more images of the vehicle and other information related to the vehicle, such as the license plate. In step 1012 of FIG. 10B, this captured information is then sent to CPU 103 via HW I/O controller 102 and CNM 104. In one embodiment, the captured information undergoes additional processing by HW I/O controller 102 before transmission to CPU 103. In step 1013 of FIG. 10B, CPU 103 performs further processing of the transmitted data as necessary. In one embodiment, this comprises performing further calculations and algorithms as needed. As part of step 1013, CPU 103 generates custom data 211 for display on windshield 205. In step 1014 CPU 103 displays the generated custom data 211 on windshield 205. In one embodiment, in step 1014 CPU 103 augments the user's view of the vehicle on the windshield 205 with the custom data 211 as shown in FIG. 10. As shown in FIG. 10, in one embodiment, custom data 211 comprises augmented reality overlay elements which display the speed and are overlaid proximate to the user's view of the vehicles on windshield 205. For example, tag 1011-A comprising the speed of the vehicle 1001-A augments the user's view of vehicle 1001-A; tag 1011-B comprising the speed of the vehicle 1001-B augments the user's view of vehicle 1001-B and so on. In another embodiment, the speed is displayed on the windshield 205 along with the vehicle registration information. If the speed exceeds a designated limit for that road, then a further indication is provided to the user as part of custom data 211. An example of this is shown in item 1021 in FIG. 10. This enables the user to initiate a pursuit of the speeding vehicle to issue a ticket. In a further embodiment, the record of the speed is transmitted to data center 110 by CPU 103. In yet another embodiment, the speed of the vehicle is recorded continually using multiple data records. These multiple data records of the speed of the vehicle are stored over a period of time by CPU 103 and transmitted to data center 110. In a further embodiment, these multiple data records are then used to generate the ticket for the speeding driver or as evidence in case of a challenge by the driver. While the example processes described above and in FIG. 10 shows a situation where the user's line of vision is perpendicular to the direction of travel of vehicles 1001-A to 1001-D, it is known to one of skill in the art that the processes described above are applicable to situations where the user's line of vision has an orientation other than perpendicular to the direction of travel of the vehicles 1001-A to 1001-D. For example, the processes described above are also applicable to situations where the user's line of vision is parallel to the direction of travel of the vehicles 1001-A to 1001-D.

In yet another embodiment, information on a potential situation is sent to the law enforcement vehicle from data center 110. Then, for example, custom data 211 displayed on windshield 205 comprises the following information:

Data about the potential situation,
  Navigational data to enable the driver to proceed to the location of the situation,
  If the situation is a mobile one, for example, if it involves pursuit of a suspected vehicle or a suspected fleeing criminal, further information could be provided to the user including:
    Path taken by the suspected vehicle or fleeing criminal, or
    Identification of the suspected vehicle or fleeing criminal.

When the user is able to view the suspected vehicle or fleeing criminal via the windshield 205, custom data 211 is used to augment the view of the suspected vehicle. For example, in one embodiment, custom data 211 comprises one or more augmented reality overlay elements such as a tag which is then overlaid proximate to the user's views of the suspected vehicle or fleeing criminal on windshield 205.

In yet another embodiment, if the user has a body camera and/or other body-mounted audio recording devices mounted as part of image capture system 101-A and/or one or more audio units 101-F, then the data captured by the body camera and/or the body mounted audio recording devices is stored by CPU 103 and is also viewable on windshield 205 and/or audio output units Then in one embodiment, this captured information is used by CPU 103 to perform searches described above, upon request by the user. In one embodiment, the results of the search are transmitted to the user via, for example, an audio device or earpiece carried by the user.

In the case where the user is the driver of the vehicle, displaying custom data 211 on windshield 205 helps the user perform tasks without having to look away from the road ahead, thereby reducing the potential for distracted driving. Using augmentation helps the user to relate information to visual observation of items on the windshield 205, thereby improving the accuracy and efficiency of the user in performing necessary tasks.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. An augmented reality head up display (AR-HUD) system for a vehicle associated with a user, wherein said vehicle comprises a windshield, and said AR-HUD system comprises:

input devices comprising
a body camera worn by the user, and
one or more body-mounted audio recording devices worn by the user;
a windshield projector;
a communications path coupled to a data center and one or more external parties;
a central processing unit (CPU) communicatively coupled to
said input devices,
said communications path, and
said windshield projector
via a communications network manager;
further wherein
said input devices are used to capture input data comprising
a detected eye position,
one or more detected positions corresponding to one or more real world objects viewed through said windshield,
further wherein said one or more real world objects comprise a target vehicle,
an image of a target vehicle license plate associated with said target vehicle, and
data captured by the body camera or the one or more body mounted audio recording devices;
said communications network manager is used to
receive said captured input data from said input devices,
receive data from said communications path from at least one of said data center and said one or more external parties,
provide said received captured input data and said data received from said communications path to said CPU, further wherein
said CPU transmits one or more search requests based on said received captured input data, and
said data received from said communications path comprises one or more records retrieved based on said one or more search requests;
said CPU is used to generate custom data based on at least one of
said received captured input data, and
said data received from said communications path, wherein said custom data comprises one or more augmented reality overlay elements, further wherein
said one or more augmented reality overlay elements are generated based on at least one of
said detected eye position,
said one or more detected positions corresponding to one or more real world objects viewed through said windshield,
said data captured by the body camera or the one or more body mounted audio recording devices, and
said one or more records retrieved based on said one or more search requests; and
said windshield projector is used to display said generated custom data on a windshield of the vehicle, wherein
at least one of said one or more augmented reality overlay elements is associated with said target vehicle and is displayed on said windshield proximate to one or more views of said target vehicle on said windshield.

2. The system of claim 1, wherein said one or more search requests comprise a first search request and a second search request;
said first search request is based on the image of the target vehicle license plate associated with said target vehicle; and
said second search request is based on the data captured by the body camera or the one or more body mounted audio recording devices.

3. The system of claim 1, wherein one of said one or more search requests is based on
the image of the target vehicle license plate associated with said target vehicle, and
the data captured by the body camera or the one or more body mounted audio recording devices.

4. The system of claim 1, wherein at least some of said data captured by the body camera or the one or more body mounted audio recording devices is related to said target vehicle.

5. The system of claim 1, wherein at least some part of said retrieved one or more records is transmitted to said user via an audio device or an earpiece carried by said user.

6. The system of claim 2, wherein
at least one of said one or more records is retrieved based on said second search request; and
at least one of said one or more augmented reality overlay elements is generated based on
said detected eye position,
said one or more detected positions corresponding to one or more real world objects viewed through said windshield, and
said at least one of said one or more records retrieved based on said second search request.

7. The system of claim 2, wherein
at least some of said one or more records are retrieved based on said first and said second search request; and
at least one of said one or more augmented reality overlay elements is generated based on
said detected eye position,
said one or more detected positions corresponding to one or more real world objects viewed through said windshield, and
said at least some of said one or more records retrieved based on said first and second search request.

8. The system of claim 5, wherein
at least one of said one or more records is retrieved based on said one of said one or more search requests; and
at least one of said one or more augmented reality overlay elements is generated based on
said detected eye position,
said one or more detected positions corresponding to one or more real world objects viewed through said windshield, and
said at least one of said one or more records retrieved based on said one of said one or more search requests.

9. The system of claim 1, further wherein said one or more augmented reality overlay elements are generated based on said data captured by the body camera or the one or more body mounted audio recording devices.

10. The system of claim 9, wherein at least some part of said retrieved one or more records is transmitted to said user via an audio device or a earpiece carried by said user.

11. A method for augmented reality head up display in a user vehicle comprising:
capturing, by input devices, input data,
said input devices comprising a body camera worn by the user, and
one or more body-mounted audio recording devices worn by the user, and said input data comprising
a detected eye position,
one or more detected positions corresponding to one or more real world objects viewed through said windshield,
further wherein said one or more real world objects comprise a target vehicle,
an image of a target vehicle license plate associated with said target vehicle, and
data captured by the body camera or the one or more body mounted audio recording devices;
receiving, by a communications network manager, said captured input data from said input devices;
providing, by said communications network manager, said received captured input data to a central processing unit (CPU) coupled to said communications network manager;
transmitting, by said CPU, one or more search requests based on said received captured input data;
receiving, by said communications manager, data from a communications path from at least one of
a data center, and
one or more external parties;
providing, by said communications manager, said data received from said communications path, to said CPU, wherein
said data received from said communications path comprises one or more records retrieved based on said one or more search requests;
generating, by said CPU, custom data based on at least one of
said received captured input data, and
said data received from said communications path,
wherein said custom data comprises one or more augmented reality overlay elements, further wherein
said one or more augmented reality overlay elements are generated based on at least one of
said detected eye position,
said one or more detected positions corresponding to one or more real world objects viewed through said windshield,
said data captured by the body camera or the one or more body mounted audio recording devices, and
said one or more records retrieved based on said one or more search requests; and
displaying, by a windshield projector, said generated custom data on a windshield of said vehicle, wherein
at least one of said one or more augmented reality overlay elements is associated with said target vehicle and is displayed on said windshield proximate to one or more views of said target vehicle on said windshield.

12. The method of claim 11, further wherein
said one or more real world objects comprise a first person of interest;
said input data comprises an image associated with said first person of interest;
said data received from said communications path comprises records corresponding to one or more persons of interest transmitted by said data center; and
further wherein at least one of said one or more augmented reality overlay elements is
associated with said first person of interest,
generated based on information obtained by said CPU cross referencing said image associated with said first person of interest with said records corresponding to one or more persons of interest, and
displayed on said windshield proximate to one or more views of said first person of interest.

13. The method of claim 12, further wherein
said one or more real world objects comprises a vehicle different to said target vehicle;
said input data comprises an image of a vehicle license plate associated with said different vehicle;
said data received from said communications path comprises records corresponding to one or more vehicles of interest transmitted by said data center,
wherein said transmission of said records corresponding to one or more vehicles of interest occurs without a search request being transmitted to said data center; and
further wherein at least one of said one or more augmented reality overlay elements is
associated with said different vehicle,
generated based on information obtained by said CPU cross referencing said image of said vehicle license plate associated with said different vehicle with said records corresponding to one or more vehicles of interest, and
displayed on said windshield proximate to one or more views of said different vehicle.

14. The method of claim 13, further wherein:
said one or more real world objects comprise a second person of interest;
said input data comprises an image of said second person of interest;
said transmitted one or more search requests comprises a first search request;
said first search request comprises said image of said second person of interest to said data center via said coupled communications network manager and said communications path;
said data received from said communications path by said communications network manager comprises one or more records retrieved based on said first search request; and
further wherein said at least one of said one or more augmented reality overlay elements are
associated with said second person of interest,
generated based on said retrieved one or more records, and
displayed on said windshield proximate to one or more views of said second person of interest on said windshield.

15. The system of claim 14, wherein at least two of
said at least one of said one or more augmented reality overlay elements associated with said target vehicle,
said at least one of said one or more augmented reality overlay elements associated with said first person of interest,
said at least one of said one or more augmented reality overlay elements associated with said different vehicle, and
said at least one of said one or more augmented reality overlay elements associated with said second person of interest,
are displayed on the windshield.

16. The method of claim 15, wherein said data received from said communications path comprises at least one of
an email;

an instant message;
a broadcast message; and
a telephone call.

17. The method of claim 16, wherein said custom data comprises one or more of
a notification associated with the email;
a messenger icon associated with the instant message;
an email icon associated with the email;
a broadcast message icon associated with the broadcast message;
a scrolling banner, and
a telephone icon associated with the telephone call.

18. The method of claim 17, wherein said input data comprises a speed corresponding to said target vehicle; and
further wherein said at least one of said one or more augmented reality overlay elements comprise said speed.

19. The method of claim 18, further wherein
said at least one of said one or more augmented reality overlay elements comprises an indication that said speed exceeds a limit for a road travelled on by said target vehicle; and
a ticket is generated based on said input data.

20. A method for an augmented reality head up display (AR-HUD) for a vehicle associated with a user, said vehicle having a windshield, said method comprising:
providing input devices comprising
a body camera worn by the user,
one or more body-mounted audio recording devices worn by the user, and
said input devices are used to capture input data comprising
a detected eye position,
one or more detected positions corresponding to one or more real world objects viewed through said windshield,
further wherein said one or more real world objects comprise a target vehicle,
an image of a target vehicle license plate associated with said target vehicle, and
data captured by the body camera or the one or more body mounted audio recording devices;
providing a communications network manager to
receive said captured input data from said input devices, and
receive data from a communications path coupled to at least one of a data center and one or more external parties;
providing a central processing unit (CPU), wherein
said communications network manager transmits said received captured input data and said data received from said communications path to said CPU,
said CPU transmits one or more search requests based on said received captured input data,
said data received from said communications path comprises one or more records retrieved based on said one or more search requests, and
said CPU generates custom data based on at least one of
said received captured input data, and
said data received from said communications path,
wherein said generated custom data comprises one or more augmented reality overlay elements, further wherein
said one or more augmented reality overlay elements are generated based on at least one of
said detected eye position,
said one or more detected positions corresponding to one or more real world objects viewed through said windshield,
said data captured by the body camera or the one or more body mounted audio recording devices, and
said one or more records retrieved based on said one or more search requests; and
providing a windshield projector to display said generated custom data on the windshield of the vehicle, wherein
at least one of said one or more augmented reality overlay elements is associated with said target vehicle and is displayed on said windshield proximate to one or more views of said target vehicle on said windshield.

* * * * *